Nov. 11, 1924.  
E. ROWART  
1,515,174  
MEANS FOR THE MANUFACTURE OF GLASS IN CONTINUOUS SHEETS  
Filed April 26, 1922
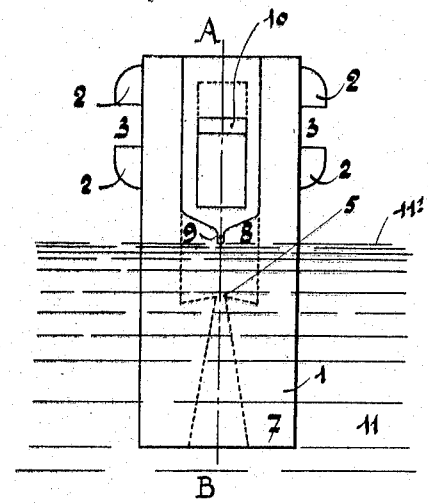
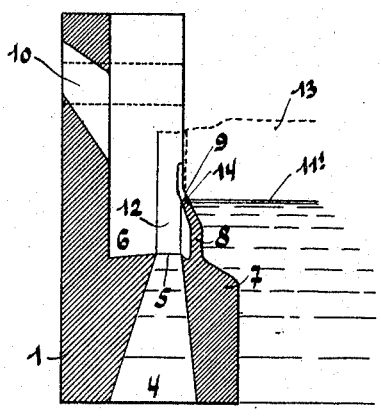
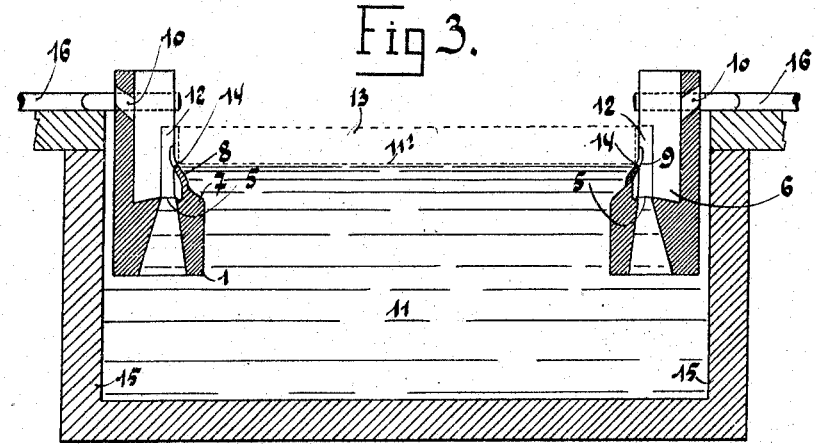

Patented Nov. 11, 1924.

1,515,174

UNITED STATES PATENT OFFICE.

EUGENE ROWART, OF AUVELAIS, BELGIUM.

MEANS FOR THE MANUFACTURE OF GLASS IN CONTINUOUS SHEETS.

Application filed April 26, 1922. Serial No. 556,721.

*To all whom it may concern:*

Be it known that I, EUGENE ROWART, a subject of the King of Belgium, residing at Auvelais, in the Kingdom of Belgium, have invented certain new and useful Improvements in Means for the Manufacture of Glass in Continuous Sheets, of which the following is a specification.

My invention relates to improved means for the manufacture of glass in continuous sheets by the drawing process as described for instance in my prior Patent #1,413,238, granted April 28, 1922.

One object of my invention is to provide means for securing glass sheets of high quality, without defects, having a regular and uniform thickness throughout the length and width of the sheet.

More specially, a further object of my invention, is to prevent the continuous shrinking or contracting in width of the produced glass sheet at the place of its formation, said shrinking being due, as it is well known, to the superficial tension of the glass during the drawing up of the sheet.

With these objects in view, my invention essentially consists in improved means which will be hereinafter fully described and pointed out in the appended claims.

Referring to the annexed drawing:

Fig. 1 is a front view and Fig. 2 a transverse section of a piece of refractory material which is used according to my invention, the said piece being supposed to be immersed in a mass of molten glass.

Fig. 3 shows two pieces of this kind as they are cooperating for the production of a glass sheet.

Means suitable to prevent the shrinking of a glass sheet at the place where it is produced, have already been suggested in the manufacture of glass sheets by the drawing process. For instance, it has been suggested to cool the longitudinal edges of the sheet by projecting air on the said edges or by circulating water in metal tubes arranged so as to exert a cooling action on the edges of the sheet. Further, it has also been suggested to use smooth or grooved rollers acting on the sheet glass during the drawing operation, so as to cause a supplemental drawing of the sheet in the direction of the width, the said rollers acting eventually also as cooling means for the edges of the sheet.

All these known means, however, make the drawing apparatus very intricate and give only very imperfect result.

According to my invention, in order to prevent any shrinking of the sheet, due to the superficial tension of the glass, the edges of the sheet are separately produced, independently from the sheet properly so called; my invention consequently consists in means whereby two strips of glass, adapted to constitute the edges of the sheet, can be produced separately, the said strips uniting themselves with the sheet properly so called during the drawing up of this latter, thus preventing the action of the superficial tension of the glass to exert itself on the edges of the sheet which is to be produced. To this end, two hollow refractory pieces are immersed simultaneously at a suitable distance from each other according to the width of the glass sheet which is to be produced in a mass of molten glass which is kept at a suitable temperature for the drawing operation. Each of the said pieces is provided with a hole from which the molten glass is continuously ejected on account of the gradual immersion of the piece into the mass of glass and the two strips of glass issuing from the said holes are lifted or drawn up whilst in the middle portion of the mass of molten glass, between the said two pieces, the main part or body of the glass sheet is simultaneously lifted the said main part or body portion of the sheet uniting them with the two strips as soon as the said main part or body portion comes into contact with the lateral strips in suitable grooves provided in the opposite faces of the refractory pieces.

As already stated Figs. 1 and 2 show such a refractory piece. The said hollow piece 1 is open in one face and is provided laterally with projections 2 whereby it may be supported in a kind of fork (not shown in Figs. 1 and 2) engaging in the space 3 between the two projections 2. Each piece is further provided in its bottom, with a bell-mouthed passage ending at its upper part in a hole 5 provided in the bottom of the hollow space 6. The front face 7 of the said piece forms a lip 8 which is inclined towards the interior of the space 6, is gradually thinner, and forms in the axes of the piece a groove 9. The piece may be further provided in its rear face with an opening 10 which may be used as a draft-hole to control the drawing operation.

To produce a glass sheet, two refractory pieces of this construction are immersed (Fig. 3) in a mass of molten glass 11 and are maintained at a distance from each other corresponding to the width of the sheet of glass which is to be produced. As the said pieces 1 are lowered in the molten glass, for instance by aid of forks engaging the projections 2, the glass ascends in the passage 4 and escapes through the hole 5 where it may be lifted by aid of a suitable bait (as it is well-known in the manufacture of glass-sheets by the drawing process) so as to form a narrow strip 12 before the mass of glass 11 will have reached the upper edge of the lip 8 or more exactly the bottom of groove 9 as indeed the hole 5 is at a level lower than the bottom-level of groove 9.

When the refractory pieces 1 have been gradually lowered into or immersed in the molten glass 11 until the bottom of the grooves 9 attain the upper level of the glass shown by the dotted line 11', the molten glass 11 will flow over the groove 9 of lip 8 and will unite with the glass strip 12 in the groove 9. If, at the said moment, the central part forming the main portion 13 of the glass sheet, is also lifted or drawn up by aid of a suitable bait, the said portion 13 and the strips 12 may then be drawn simultaneously, uniting to each other at the points of junction 14 (Figs. 2 and 3).

The pieces 1 will then be maintained in this position and retained by aid of the forked bars 16 attached to the wall of the glass cup 15. The drawing operation may then proceed, the strips 12 and the main portion 13 of the sheet being drawn simultaneously. The sheet thus produced will consequently be composed of the main portion 13 and the two lateral strips 12 forming the edges of the sheet; the said edges being lifted separately with a small width will avoid the action of the superficial tension of the glass on the edges of the sheet and will consequently prevent any shrinking of the said sheet, as it was the case previously.

The sheet, thus produced, will be at a very uniform temperature in its whole width and will not need an excessive reheating in order to restore its thermic equilibrium; it will only be necessary to conduct the sheet of glass after its production through a zone having a temperature suitable to anneal the glass perfectly but which however will be maintained sufficiently low to avoid the softening of the sheet.

To this end the glass container 15 (Fig. 3) will be combined in practice and in any known manner with a working chamber and with a heating chamber securing the required temperatures, further the container will be provided with suitable feeding means adapted to place the molten glass in the best conditions for the drawing operation. The said auxiliary means are well-known in this art and make no part of my invention. In my prior Patent #1,413,238, granted April 28, 1922, I have shown suitable means for feeding the molten glass to the container 15, also for securing the necessary temperature and drawing the sheet of glass after it has been produced, reheating and finally gradually cooling the same.

What I claim is:

1. The process of drawing a glass sheet from a mass of molten glass, the said process consisting in lifting vertically first from the said mass two narrow strips of glass from a point below the level of the mass of molten glass, the said strips being lifted at a distance from each other corresponding to the width of the glass sheet which is to be produced, then lifting the sheet of glass from the mass of molten glass between the said strips, whereby the said strips become united with the glass sheet and finally lifting simultaneously the sheet and strips.

2. The process of drawing a glass sheet from a mass of molten glass, the said process consisting in lifting first vertically from the said mass two narrow strips of glass from a point below the level of the mass of molten glass, the said strips being lifted at a distance from each other corresponding to the width of the glass sheet which is to be produced, protecting the said strips against any contact with the mass of molten glass until they reach the level of the mass of molten glass, then lifting the sheet of glass from the mass of molten glass between the said strips, whereby said strips become united with the glass sheet, and finally lifting simultaneously the sheet and strips whereby a sheet is produced having a width corresponding to the sum of the width of the width of the strips and of the distance between the said strips.

3. The process of drawing a glass sheet from a mass of molten glass, the said process consisting in dipping gradually in the said molten glass, two vertically channelled refractory pieces having in their upper part free open, lateral faces, the said pieces being located at a distance from each other corresponding to the width of the glass sheet which is to be produced, whereby molten glass is caused to issue from the bottom channels of the said pieces, lifting the issuing glass in the vertical axis of the refractory pieces in the form of two narrow strips and in alignment with the bottom channels of the refractory pieces, dipping then gradually further the refractory pieces into the mass of molten glass as the lifting proceeds until the free open lateral faces of the refractory pieces reach the level of the mass of molten glass, then lifting a glass sheet from the mass of molten glass between the said free open faces, whereby the two narrow strips become united with the said glass sheet, then fixing the refractory pieces in their lowest dipped position, and finally lifting simultaneously both strips in vertical alignment with the channels of the refractory pieces and the sheet between the said strips, whereby a sheet is produced having a width corresponding to the sum of the width of the strips and of the distance between the said strips.

4. The process of drawing a glass sheet from a mass of molten glass, which comprises drawing separate spaced strips of glass from said mass below the level of said mass, and drawing a connecting sheet between and separate from the strips, and allowing the sheet and strips to unite as the drawing proceeds.

5. The process of drawing a glass sheet from a mass of molten glass, which comprises drawing separate spaced strips of glass from said mass below the level of said mass, and drawing a connecting sheet between and separate from the strips, and causing the strips to unite with the opposite edges of the sheet at approximately the point where the drawn sheet leaves the mass of molten glass.

6. In apparatus for the drawing of glass in continuous sheets, the combination with a glass container, of two refractory pieces arranged at a distance from each other corresponding to the width of a sheet of glass which is to be produced, a hollow space in each of the said pieces, the said hollow space being open in one face of the piece, a passage in the bottom of each piece, the said passage ending by a drawing hole in the said bottom, a lip in the front face of each piece, the said lip being inclined and gradually thinner towards the hollow space and provided with a groove, the bottom of which is at a level above the bottom of the hollow space of the piece, means for immersing the said pieces into a mass of molten glass in the container, whereby two narrow strips of glass may be lifted from the bottom of the hollow space of the refractory pieces before the molten glass in the container has reached the bottom of the groove in the inclined lip, the said strips uniting with the sheet of glass lifted from the mass of molten glass, between the said inclined lips.

In testimony whereof I have affixed my signature in presence of two witnesses.

EUGENE ROWART.

Witnesses:
JACQUES BEDE,
F. BOLAND.